United States Patent
Metcalfe et al.

(10) Patent No.: US 7,830,554 B2
(45) Date of Patent: Nov. 9, 2010

(54) FIDUCIAL ARTIFACT DETECTION AND COMPENSATION ALGORITHM

(75) Inventors: David J. Metcalfe, Marion, NY (US); Terri A. Clingerman, Palmyra, NY (US); Stuart A. Schweid, Pittsford, NY (US); Howard Mizes, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 802 days.

(21) Appl. No.: 11/823,893

(22) Filed: Jun. 29, 2007

(65) Prior Publication Data

US 2009/0003729 A1    Jan. 1, 2009

(51) Int. Cl.
G06K 15/00   (2006.01)
H04N 1/405   (2006.01)
H04N 1/46    (2006.01)

(52) U.S. Cl. ............ 358/3.21; 358/3.06; 358/3.24; 358/504

(58) Field of Classification Search ............ 358/1.9, 358/3.06, 3.26, 3.27, 406, 504
See application file for complete search history.

(56) References Cited

U.S. PATENT DOCUMENTS

| | | | |
|---|---|---|---|
| 4,553,033 A | 11/1985 | Hubble et al. | |
| 5,177,621 A | 1/1993 | Ohtaki | |
| 5,543,896 A | 8/1996 | Mestha | |
| 5,546,165 A | 8/1996 | Rushing | |
| 5,649,073 A | 7/1997 | Knox | |
| 5,710,836 A | 1/1998 | Shiau | |
| 6,035,152 A | 3/2000 | Craig | |
| 6,249,357 B1 | 6/2001 | Metcalfe | |
| 6,760,056 B2 | 7/2004 | Klassen | |
| 6,819,352 B2 | 11/2004 | Mizes | |
| 6,843,610 B2 * | 1/2005 | Ioka et al. | 400/76 |
| 6,907,132 B1 * | 6/2005 | Salomon | 382/101 |
| 7,095,531 B2 | 8/2006 | Mizes | |
| 2006/0209101 A1 * | 9/2006 | Mizes | 347/2 |

* cited by examiner

*Primary Examiner*—James A Thompson
(74) *Attorney, Agent, or Firm*—Fay Sharpe LLP

(57) ABSTRACT

Defects in an image forming system may give rise to scratched fiducials, missing fiducial regions, or other defects in an image that can run parallel to the process direction. The present disclosure provides for a fiducial compensation method and system for detecting defects thereby allowing spatial tone reproduction curves to be calculated and applied to a digital image in order to eliminate printed streaks due to a photoreceptor's non-uniformities.

21 Claims, 14 Drawing Sheets

FIDUCIAL ARTIFACT DETECTION AND COMPENSATION ALGORITHM

BACKGROUND

This disclosure relates to systems and methods for reducing print defects in images. Defects in the subsystems of a xerographic, electrophotographic or similar image forming system, such as a laser printer, digital copier or the like, may give rise to visible streaks in a printed image. Streaks are primarily one-dimensional defects in an image that run parallel to the process direction. Typical defects might arise from a non-uniform LED imager, contamination of the high voltage elements in a charger, scratches in the photoreceptor surface, etc. In a uniform patch of gray, streaks and bands may appear as a variation in the gray level. In general, "gray" refers to the intensity value of any single color separation layer, whether the toner is cyan, magenta, yellow, or black (CMYK) or some other color.

One method of reducing such streaks is to design and manufacture the critical parameters of the marking engine subsystems to tight specifications. Often though, such precision manufacturing will prove to be cost prohibitive.

A tone reproduction curve (TRC) may be measured by printing patches of different bitmap area coverage. In some digital image processing applications, the reflectivity of a patch of gray is measured with a toner area coverage sensor. The manner of operation of the toner area coverage sensor is described in U.S. Pat. No. 4,553,033, which is incorporated herein by reference in its entirety. Toner area coverage sensors are typically designed with an illumination beam much larger than the halftone screen dimension. This large beam does not provide the resolution for the toner area coverage sensor to be useful as a sensor for the narrow streaks that may occur for poorly performing subsystems.

U.S. Pat. No. 6,760,056 by Klassen et al, incorporated herein by reference in its entirety, discloses one exemplary embodiment of a method for compensating for streaks by introducing a separate tone reproduction curve for each pixel column in the process direction. A compensation pattern is printed and then scanned to first measure the ideal tone reproduction curve and then detect and measure streaks. The tone reproduction curves for the pixel columns associated with the streak are then modified to compensate for the streak.

SUMMARY

In implementing the methods and systems of the present patent application, the inventors of this disclosure discovered additional problems that needed to be solved before the streaks could be acceptably compensated for. For example, in order to precisely locate the halftone patches and map the spatial TRC to the appropriate pixels, a fiducial pattern with a known periodic frequency is placed above each patch area. Periodically the fiducial pattern itself may be damaged before it is sensed. The underlying photoreceptor reflectivity may also vary, decreasing the contrast of the fiducial and cause an error in mapping the halftone strip. These imperfections may result in applying an incorrect spatial TRC mapping to the digital input image.

A method is provided for compensating for streak defects in an image formed using an image forming device that forms the image on a receiving material that is translated through the image forming device along a process direction. The method comprises printing a plurality of gray level portions wherein each gray level portion having a gray level that is different from the other gray level portions and extending along the cross-process-direction. The plurality of gray level portions are arranged along the process direction, and spaced from each other along the process direction such that a gap is provided between each pair of adjacent gray level portions. The method further comprises printing a number of rows of fiducial marks. The rows of fiducial marks are distributed among the plurality of gray level portions and include at least some of: a first row of fiducial marks located before the plurality of gray level portions along the process direction, a second row of fiducial marks located after the plurality of gray level portions along the process direction, and at least one third row of fiducial marks wherein each third row of fiducial marks are located in a gap between a pair of adjacent gray level portions. The method further provides for scanning the plurality of gray level portions and number of rows of fiducial marks to generate a set of scanned image data, the scanned image data defining an image value for each of a plurality of scanned image cross-process-direction pixel locations for at least one of the gray level portions and for at least one row of fiducial marks; and determining for each of the fiducial marks in at least one row of fiducial marks associated with the current scanned image cross-process-direction pixel location, a centroid of that fiducial mark. The method can then analyze the scanned image data for at least one of the at least one row of fiducial marks to determine at least one missing fiducial mark based on a location of at least one fiducial mark of the at least one row of fiducial marks in the scanned image data; and, compensate for at least one missing fiducial mark by overwriting and asserting at least one fiducial having a centroid determinable by the centroids of adjacent fiducials.

A method is provided for compensating for streak defects in an image formed using an image forming device that forms the image on a receiving material that is translated through the image forming device along a process direction. The method comprises printing a plurality of gray level portions wherein each gray level portion having a gray level that is different from the other gray level portions and extending along the cross-process-direction. The plurality of gray level portions are arranged along the process direction, and spaced from each other along the process direction such that a gap is provided between each pair of adjacent gray level portions. The method further provides for printing a number of rows of fiducial marks. The rows of fiducial marks are distributed among the plurality of gray level portions and comprise at least some of: a first row of fiducial marks located before the plurality of gray level portions along the process direction, a second row of fiducial marks located after the plurality of gray level portions along the process direction, and at least one third row of fiducial marks. Each third row of fiducial marks are located in a gap between a pair of adjacent gray level portions. The method still further provides for scanning the plurality of gray level portions and number of rows of fiducial marks to generate a set of scanned image data. The scanned image data defines an image value for each of a plurality of scanned image cross-process-direction pixel locations for at least one of the gray level portions and for at least one row of fiducial marks. The method then determines for each of the fiducial marks in at least one row of fiducial marks associated with the current scanned image cross-process-direction pixel location, a centroid of that fiducial mark. The method analyzes the scanned image data for at least one of the at least one row of fiducial marks to determine at least one scratched fiducial mark based on a location of at least a pair of fiducial marks of the at least one row of fiducial marks in the scanned image data; and, compensates for at least one scratched fiducial mark by overwriting and asserting at least one fiducial having a single centroid determinable by the centroids of adjacent fiducials.

A printing system is provided for compensating for streak defects in an image formed using an image forming device that forms the image on a receiving material that is translated through the image forming device along a process direction. A print from the system can include a plurality of gray level portions wherein each gray level portion having a gray level that is different from the other gray level portions and extending along the cross-process-direction. The plurality of gray level portions are arranged along the process direction, and spaced from each other along the process direction such that a gap is provided between each pair of adjacent gray level portions. The print further includes a number of rows of fiducial marks wherein the rows of fiducial marks are distributed among the plurality of gray level portions and comprise at least some of: a first row of fiducial marks located before the plurality of gray level portions along the process direction, a second row of fiducial marks located after the plurality of gray level portions along the process direction, and at least one third row of fiducial marks. Each third row of fiducial marks are located in a gap between a pair of adjacent gray level portions. The printing system includes a scan of the plurality of gray level portions and number of rows of fiducial marks to generate a set of scanned image data. The scanned image data defines an image value for each of a plurality of scanned image cross-process-direction pixel locations for at least one of the gray level portions and for at least one row of fiducial marks. The system can determine for each of the fiducial marks in at least one row of fiducial marks associated with the current scanned image cross-process-direction pixel location, a centroid of that fiducial mark. The scanned image data is analyzed for at least one of the at least one row of fiducial marks to determine at least one fiducial artifact based on a location of at least one fiducial mark of the at least one row of fiducial marks in the scanned image data. The system then compensates for the at least one fiducial artifact by overwriting and asserting at least one fiducial having a single centroid determinable by the centroids of adjacent fiducials.

BRIEF DESCRIPTION OF THE DRAWINGS

Various exemplary embodiments of this disclosure will be described in detail, with reference to the following figures, wherein.

DETAILED DESCRIPTION OF EXEMPLARY EMBODIMENTS

The compensation technique described herein can be applied to both color and monochrome image forming devices. For monochrome image forming devices, the technique is as described below. Color monochrome image forming devices operate by overlaying different color separation layers. Each color separation layer can be individually compensated for using the techniques described herein. As used herein, the term "gray" indicates the amount of coverage of material between zero and 100% density on the printed surface, although in general this material may be colored.

An input gray level is typically an integer between 0 and 255 that is sent to the marking engine from a computer, an input scanner or other image data source. An actual gray level is the response of a sensor measuring the gray level of the printed image. The actual gray level can be a function of distance in the cross-process direction. The desired gray level is defined as the response of the sensor to what the marking engine was designed to print. The desired gray level is independent of position for a uniform gray strip, and, for example, can be the average of all the actual gray levels. The desired gray level can also be a target value that the marking engine is designed to print.

The desired gray level, as a function of the input gray level, defines an intended tone reproduction curve. The actual gray level as a function of the input gray level defines a local tone reproduction curve. A local reproduction curve exists for each pixel location in the printed image in the cross-process direction. Thus, for example, a 600-spi printer that is 11 inches wide would have one desired tone reproduction curve and 6600 (600×11) local tone reproduction curves, one for each of the 6600 different pixel locations.

Figure 1:
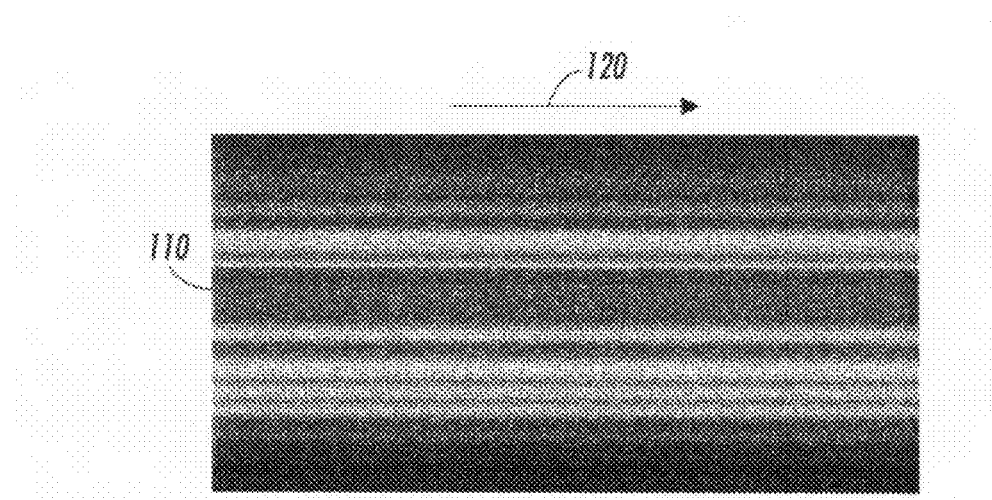
FIG. 1 illustrates an image that contains streak print defects.

FIG. 1 illustrates an image patch having a single gray level value that contains a number of streak defects. Each streak defect extends along a process or slow-scan direction, while the various different streak defects are adjacent to each other along a cross-process or fast-scan direction. That is, FIG. 1 shows a printed uniform patch of gray 110 that contains streaks. As shown in FIG. 1, the streaks run parallel to the process direction 120. The magnitude of the streaking or the difference in toner density is a function of position perpendicular to the process direction. All pixels in a column that is parallel to the process direction and that is a given distance in the cross-process direction from a reference location will experience a same shift in intensity due to the streak defect.

In various exemplary embodiments, the systems and methods according to this disclosure compensate for streaks, fiducial artifacts, or improper toner density regions that run the length of the process direction and have a lighter or darker intensity than adjacent regions of the same intended intensity.

Figure 2:
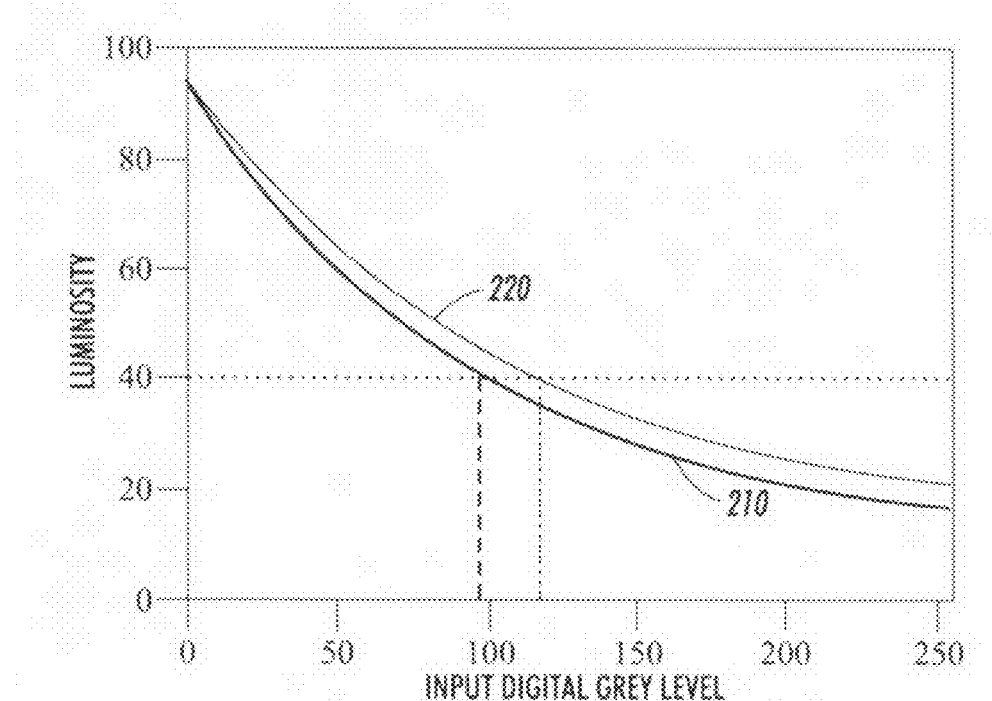
FIG. 2 is a graph illustrating an ideal tone reproduction curve and an actual toner reproduction response for a single pixel location.

FIG. 2 is a graph of several curves that show luminosity, a measure of the printed toner density, as a function of the input gray level. The ideal or intended tone reproduction curve 210 indicates the output luminosity as a function of input gray level in all pixel columns if no streak defects are present. The actual tone reproduction curve 220 is an example of actual output luminosity as a function of input gray level for a pixel column which experiences a streak defect.

That is, FIG. 2 shows a typical plot of the actual gray level for one local tone reproduction curve 220. If the printer response at this pixel were accurate, the plot of the actual gray level would match the plot of the ideal or intended tone reproduction curve 210 at all positions. Deviations of this local tone reproduction curve 220 from the ideal or intended tone reproduction curve 210 quantify the degree of streaking at all gray levels. Based on the ideal tone reproduction curve 210, if an image portion having a gray level output of 40 is desired, under ideal conditions, to obtain the desired gray level output, a xerographic or electrographic image forming system would need to print that image portion at a gray level of 117. Based on the actual tone reproduction curve 210, if the image portion having a gray level output of 40 is desired, to obtain the desired gray level output at this pixel location, the xerographic or electrographic image forming system would need to print that image portion at a gray level of 97. That is, the image data defining that image portion should be changed to instruct the xerographic or electrographic image forming system to print that image portion at a gray level of 97 at that pixel location. In practice, some parameterization of the two tone reproduction curves 210 and 220 shown in FIG. 2 are stored in memory and are used to modify the gray level defined by the image data for any gray level for this pixel location to achieve the desired gray level in the printed image portion.

In various exemplary embodiments, to compensate for the streak defects, the input gray level is changed using different local tone reproduction curves, where one local tone reproduction curve exists for each pixel in the cross-process direction, so that the actual gray level matches the desired gray level at every pixel location. This requires the ability to accurately determine the actual gray level at every pixel location in the cross-process direction. Spatial non-uniformities in a sensor may cause a discrepancy between the pixel location where the sensor measuring system or image forming system thinks the image is being measured at and the pixel location where the measurement is actually occurring. If this error occurs, then the compensation will be applied to the wrong pixel location. As a result, narrow streaks, such as the one illustrated in FIGS. 3 and 4, will not be properly compensated for.

In the example shown in FIG. 2, to achieve a constant luminosity of 40, the input gray level value for the pixel column experiencing the streak defect must be raised to a value 117 from the value 97 determined using the ideal tone reproduction curve. The input gray level is adjusted for each pixel by multiplying the input gray level for that pixel by a compensation parameter that is selected depending on the pixel location and the input level. The ideal tone reproduction curve is then applied to the compensated input image or gray level value to convert from the input gray level value to the printer dependant gray level value.

Figure 3:
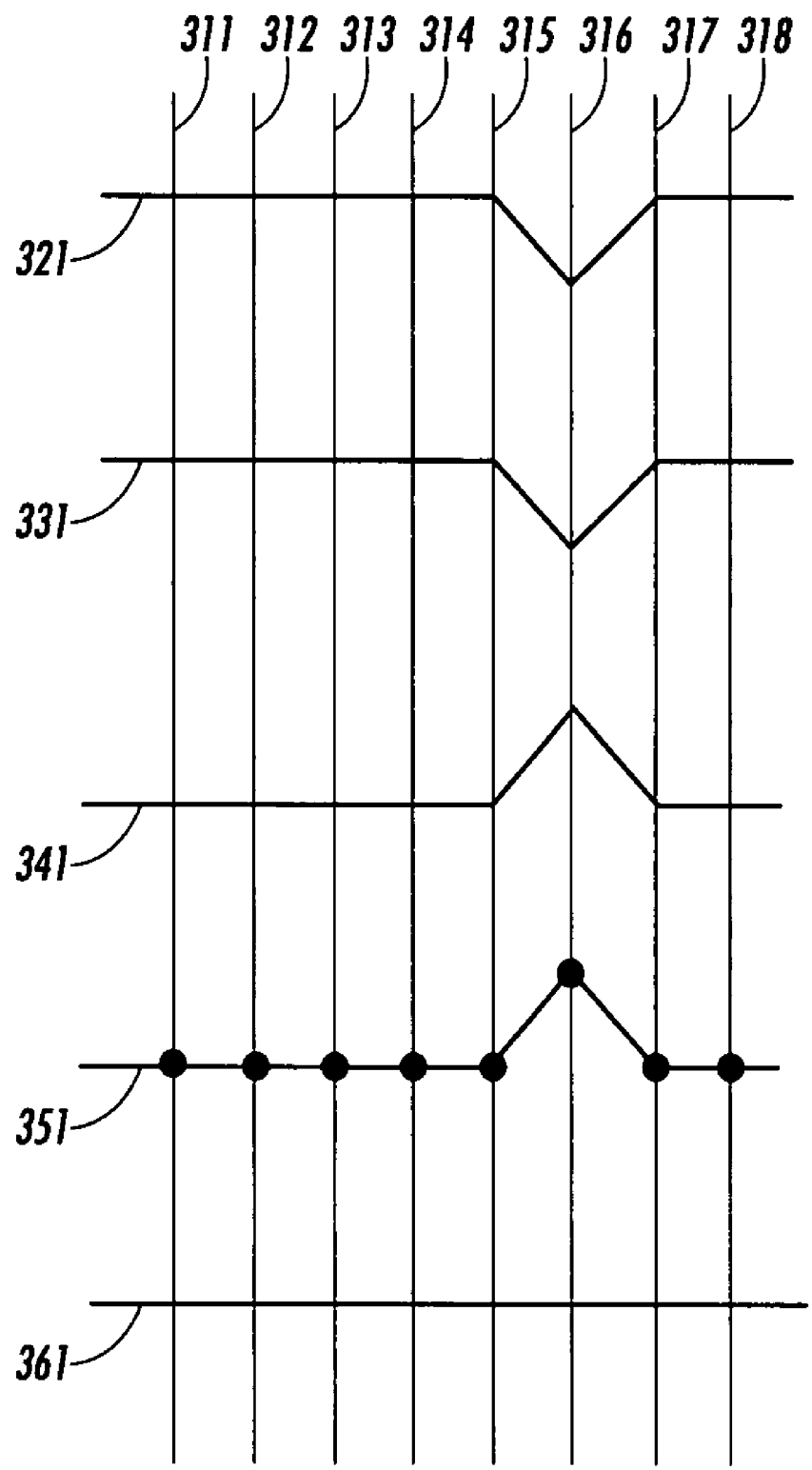
FIGS. 3 and 4 graphically illustrate the effect of a half-pixel misalignment on the streak defect compensation.
Figure 4:
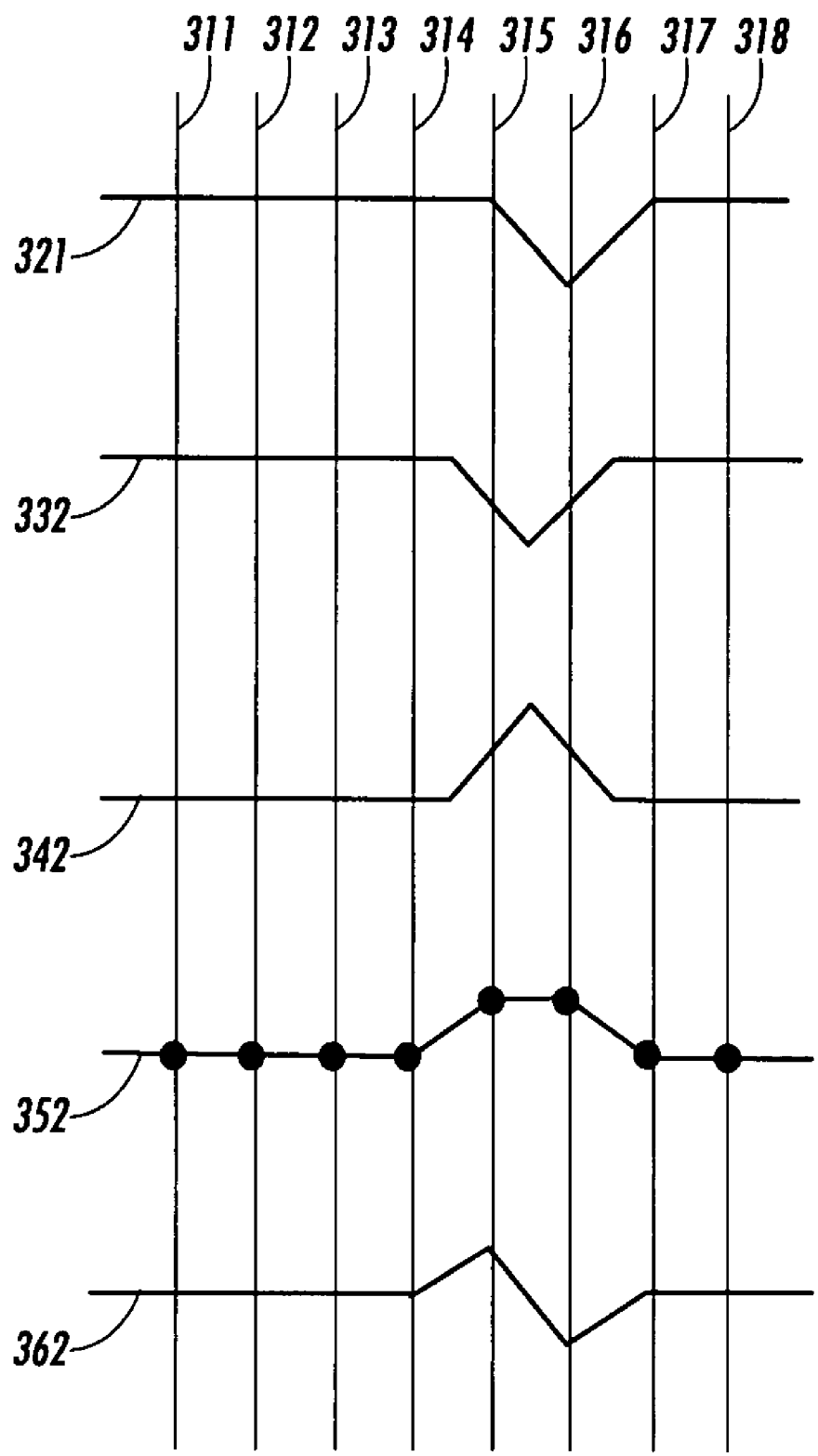

FIG. 3 and FIG. 4 graphically illustrate several curves that demonstrate streak compensation with proper and improper pixel alignment between the printer pixel grid and the pixel grid in the compensation data. The actual printed toner density values 321 shown in FIG. 3 and FIG. 4 are generated from a constant intensity input and are a function of the pixel columns 311-318. A streak defect in the actual printed toner density values 321, i.e., a different actual printed toner intensity value than the desired printed toner density values obtained at the pixel columns 311-315, 317, and 318, is seen at the pixel column 316.

FIG. 3 shows the scan data toner density values 331 obtained by scanning the printed compensation pattern in the scan data when the pixel alignment between the printer pixel grid and the pixel grid in the compensation data is appropriately aligned. The streak defect, i.e., the different actual printed toner density is also seen at the pixel column 316 of the scan data toner density values 331. An appropriately compensated input gray level curve 341 is also shown in FIG. 3, which has a difference in the intensity value for the pixel column 316 that is opposite the difference in the actual printed toner density value for the pixel column 316 that occurs in the scan data toner density values 331 that compensates for the streak defect.

When the compensated input gray level curve 341 is sampled at the printer pixel column positions, the appropriately aligned compensated halftone density curve 351 also shows the different density in, or intensity values for, the pixel column 316. When the halftone density curve 351 is used in the printing process, the output density curve 361 has the desired constant density for all of the pixel columns 311-318.

FIG. 4 shows the scan data toner density values 332 obtained by scanning the printed compensation pattern when the pixel alignment between the printer pixel grid and the pixel grid in the compensation data is misaligned by one-half pixel. The streak defect in the actual printed toner density values, i.e., the difference in the actual printed toner density values, is now seen in scan data toner density values 332 as occurring between the pixel columns 315 and 316. As a result, a misaligned compensated input gray level curve 342, also shown in FIG. 4, is generated from the misaligned scan data toner density values 332. In particular, the misaligned compensated gray level curve 342, which has a difference in the intensity values for the pixel columns 315 and 316 that is opposite the difference in the scan data toner density values 332, but which is not aligned with the location of the different value, i.e., pixel column 316, of the actual printed toner density values 321.

When the input gray level curve 342 is sampled at the printer pixel column positions 311 318, using linear interpolation between the discrete pixels, the misaligned compensated halftone density curve 352 indicates that a density of half the density needed to appropriately compensate for the streak defect, and that the compensation needs to be applied to both of the pixel columns 315 and 316. When the resulting halftone density curve 352 is used in the printing process, the output density curve 362 for the pixel column 315 is over, or unnecessarily, compensated and is under compensated for the pixel column 316. While the original streaking shown in the actual printed toner density values 321 has been modified, detectable streaking may still be seen in the output density values 362.

Figure 5:
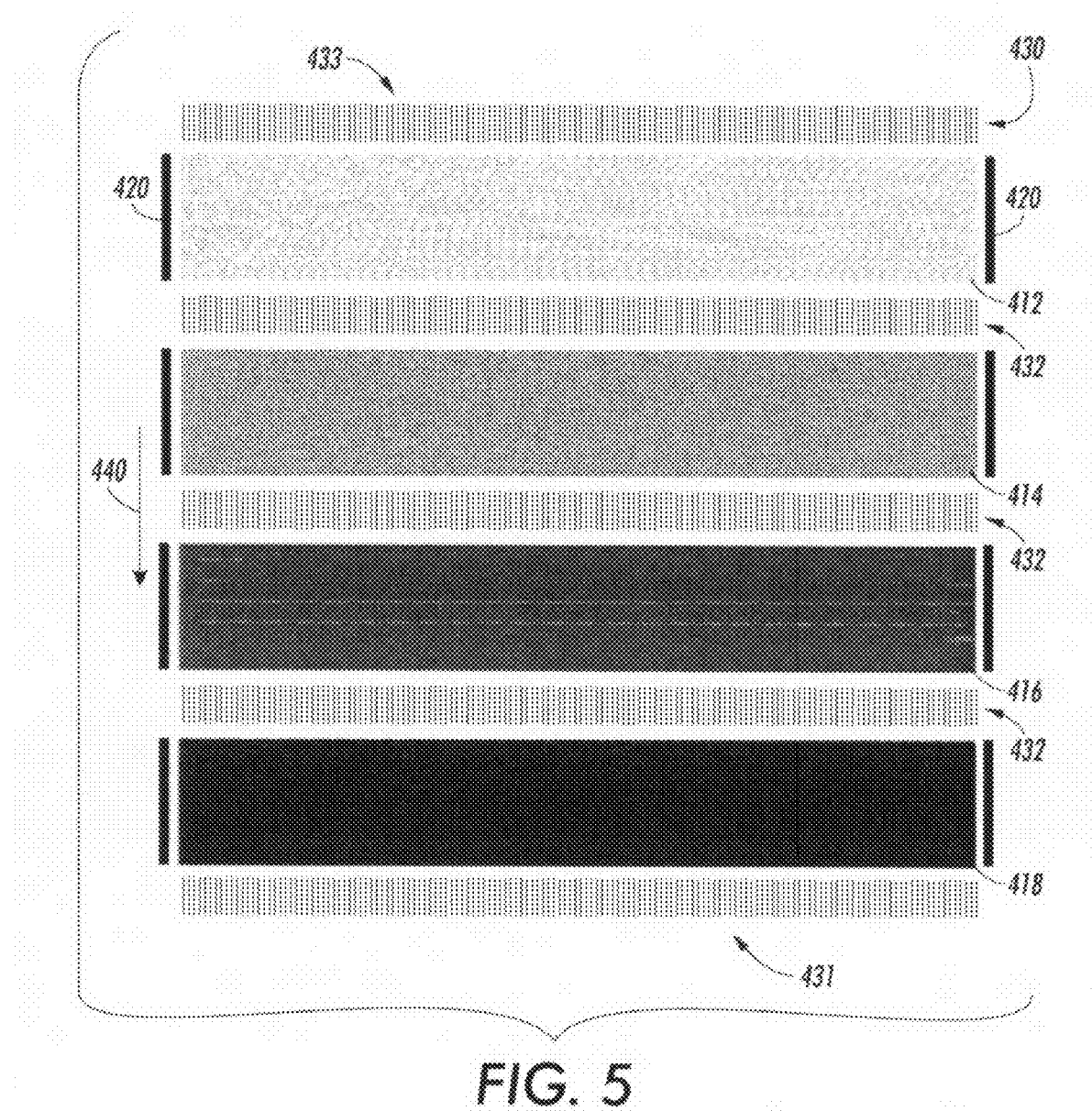
FIG. 5 illustrates a portion of one exemplary one embodiment of a compensation pattern usable to determine one or more parameters used in streak printing defect compensation according to this disclosure.

FIG. 5 shows one exemplary embodiment of a compensation pattern that allows the misalignment between the image forming device pixel grid and the scanning grid to be taken into account when determining the streak defect compensation parameters. The compensation pattern shown in FIG. 5 includes a number of halftone strips 412-418, laterally placed edge locator lines 420 and repeating sets of fiducial marks 430, including a leading set or row 431, a plurality of interstitial sets or rows 432 and a trailing set or row 433. Each halftone strip 412-418 is a region of constant gray level. Each halftone strip 412-418 has a gray level that is different from the gray level of the other strips 412-418. It should be appreciated that the difference in gray level between adjacent halftone strips does not have to be a constant. Rather, in various exemplary embodiments, the gray level increment between various ones of the halftone strips 412-418 is small where the tone reproduction curve changes rapidly and large where the tone reproduction curve changes slowly.

The number of halftone strips 412-418 desired in a compensation pattern should be large enough to finely sample the tone reproduction curve. Four halftone strips 412-418 are shown in FIG. 5. However, it should be appreciated that any number of halftone strips can be used. For example, in one exemplary embodiment, 32 strips were used to successfully implement the streak defect compensation process according to this disclosure. The halftone strips 412-418 extend sufficiently along the process direction 440 to allow for a sufficiently accurate estimate of the gray level in each pixel column and to average out any noise that occurs when forming and/or scanning the halftone strips 412-418. It should be appreciated that any design trading streak defect compensation performance against the cost of compensation pattern size and/or the cost of analyzing the scanned compensation pattern, by using differing numbers and lengths of halftone strips 412-418, is within the scope of this disclosure.

When each pixel column in a given halftone strip 412-418 is averaged over its length in the process direction 440, the periodicity of the halftone in the cross-process direction will appear in the cross section of the pixel columns. The amplitude of this cross-process halftone repeat is reduced if the length of the halftone strips 412-418 in the process direction is also an integer multiple of the halftone periodicity in the process direction.

The edge locator lines 420 are used to identify the lateral boundaries or sides of each compensation strip 412-418. Alternatively, the lateral boundaries of the compensation strips can be found with reference to the fiducial marks 430. The fiducial marks 430 are used to align the scanning coordinates of the pixel columns to the coordinates of the pixel columns in the printed image, i.e., associate a scanner pixel location along the cross-process direction with the corresponding cross-process-direction image-forming device pixel location. If the fiducial marks 430 are single-pixel lines, the centroids of those single-pixel lines will give the location of those image forming device pixels in scanning coordinates. If the fiducial marks 430 are two-pixel lines, the centroids of those lines will give the location of the midpoints between those image forming device pixels in the scanning coordinates. If the fiducial marks 430 are three or more pixels wide, the centroid of the fiducial mark 430 will give the digital center of the group of pixels composing that fiducial mark 430.

In the exemplary embodiment shown in FIG. 5, a first set of fiducial marks is provided before the first compensation strip 412, one intermediate set of fiducial marks is provided between each pair of adjacent compensation strips 412, 414; 414, 416; and 416, 418, and a last set of fiducial marks is provided after the last compensation strip 418. However, it should be appreciated that fewer (or even more) sets of fiducial marks can be provided. For example, in various exemplary embodiments, the first and/or last sets of fiducial marks can be omitted. Similarly, in various other exemplary embodiments, one or more of the intermediate sets of fiducial marks can be omitted. In general, so long as there are sufficient sets of fiducial marks to be able to accurately align the scanning coordinates of the pixel columns to the coordinates of the pixel columns in the printed image and to be able to accurately determine the image value of a given compensation strip for a given scanner pixel location along the cross-process direction, any number of the sets of fiducial marks may be omitted.

In various exemplary embodiments, the centroids of the fiducial marks 430 are found by finding, for each fiducial mark 430, a scan pixel with a minimum reflectance about that fiducial mark 430. In various exemplary embodiments, for each of the fiducial marks 430, a quadratic fit using the corresponding located scan pixel and two neighboring scan pixels to that scan pixel can be performed. The minimums of each of these quadratic fits are determined to be the centroids of the particular fiducial mark 430.

If the fiducial marks 430 are single-pixel lines, the centroids of those single-pixel lines will give the location of those image forming device pixels in scanning coordinates. If the fiducial marks 430 are two-pixel lines, the centroids of those lines will give the location of the midpoints between those image forming device pixels in the scanning coordinates. Either way, this information provides the conversion between the scanner coordinates and the printer coordinates for the associated scanner pixels and printer pixels, i.e., between the cross-process-direction scanner pixel columns and the cross-process-direction image-forming device pixel locations.

In various exemplary embodiments, the fiducial marks 430 are placed as closely as possible to the halftone strips 412-418 to maximize alignment accuracy. In various exemplary embodiments, the fiducial marks 430 are also placed before and after each halftone strip 412-418. Skew in the printing process, motion quality errors, rotation of the printed image on the scanner, and/or other errors may give a slightly different mapping for each set of fiducial marks 430. If two different maps are obtained for the fiducial marks 430 above and below a halftone strip, linear interpolation is used to determine the gray level of each scanner pixel column. The results of this image analysis is a table of $N_s$ by $N_p$, where $N_s$ is the number of different gray level portions or strips of the compensation pattern and $N_p$ is the number of scanner pixel locations or columns along the cross-process direction.

Figure 6:
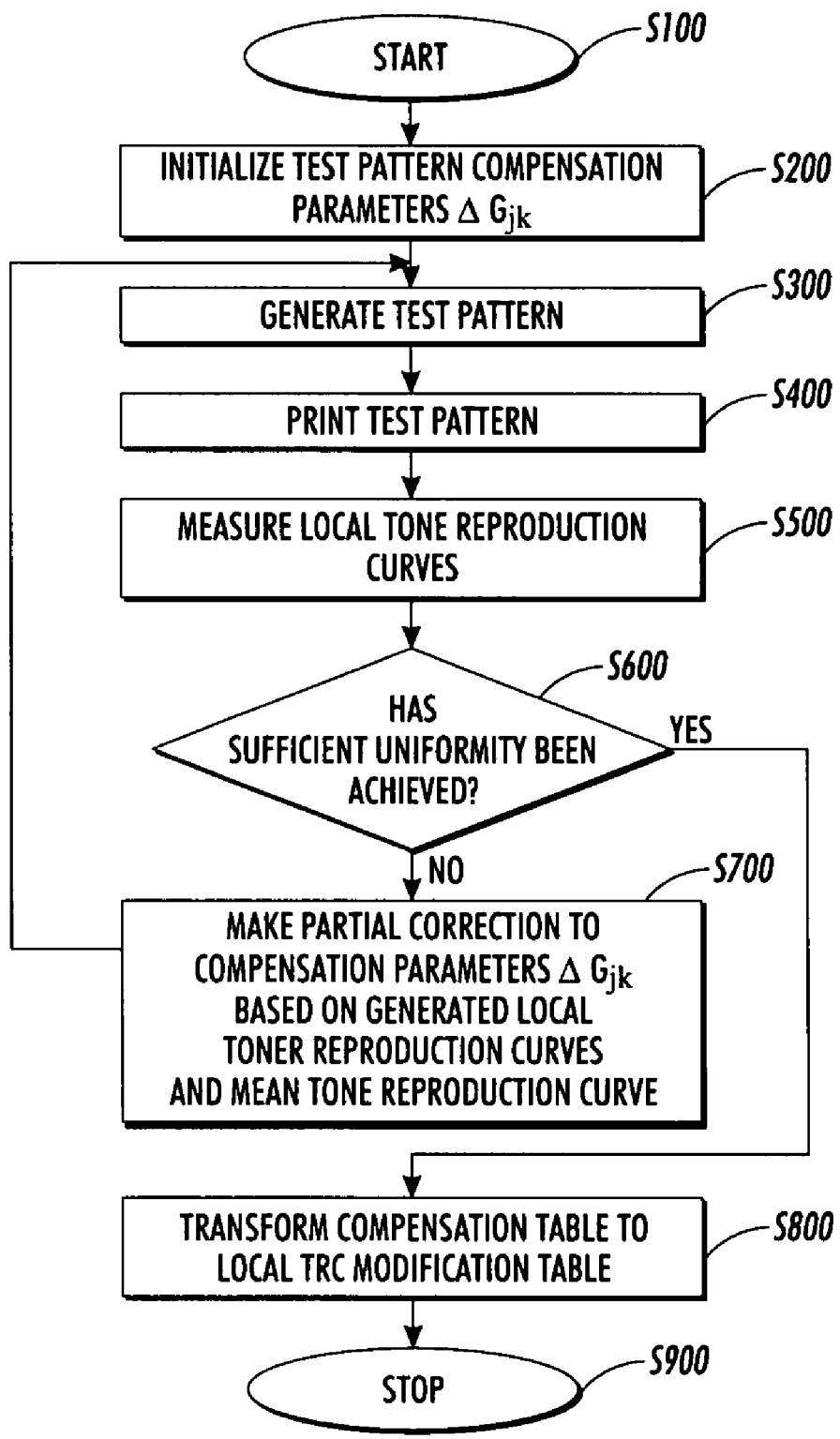
FIG. 6 is a flowchart outlining one exemplary embodiment of a method for generating a set of compensation parameters usable to compensate any image during printing.

FIG. 6 is a flowchart outlining one exemplary embodiment of a method for determining the local TRC compensation parameters according to this disclosure. In various exemplary embodiments, the compensation parameter is defined as $\Delta G_{ijk}$, where i is the iteration number, j is the pixel column, and k is the gray level. The compensation parameters are initialized by setting $\Delta G_{0jk}=0$ for all values of j and k.

As shown in FIG. 6, operation of the method begins in step S100, and continues to step S200, where the compensation parameters $\Delta G_{1jk}$ are initialized. It should be noted that the initialized compensation parameters $\Delta G_{1jk}$ have no effect on the digital gray image. In other words, the digital gray input values are the same as the digital gray output values. Then, in step S300, a compensation test pattern is generated. In general, a compensation test pattern consistent with the description provided above with respect to FIG. 5 is used. Next, in step S400, the digital test pattern for the $i^{th}$ iteration is halftoned and printed. Operation then continues to step S500.

In step S500, the printed test pattern is scanned and the local tone reproduction curve is measured. Next, in step S600, a determination is made whether sufficient uniformity in the gray level strips of the printed compensation test pattern has been achieved. If not, operation continues to step S700. Otherwise, once sufficient uniformity has been achieved, operation jumps to step S800. It should be appreciated that, in this exemplary embodiment, the gray level strips become more uniform as the compensation procedure proceeds. In various exemplary embodiments, the uniformity of the gray level strips is defined by one or more metrics. In these exemplary embodiments, based on the values of the metrics, the uniformity of the gray level strips is determined to be sufficient or not. Of course, any desired technique can be used to determine whether the uniformity of the gray level strips is sufficient.

In step S700, the compensation parameters ΔG are partially updated. The amounts used to update the compensation parameters $\Delta G_{ijk}$ for each pixel column j are determined by comparing the local tone reproduction curves for the pixel columns j to the mean tone reproduction curve. The local tone reproduction curves for the pixel columns is the set of points relating the scanner response $R_{jk}$ for the pixel column j to the gray level input k for the pixel column j. Each point in the mean tone reproduction curve is the scanner response averaged over all the pixel columns j for the corresponding gray level k. In some exemplary embodiments, not all gray levels k are printed in the test pattern. In these exemplary embodiments, an interpolation scheme can be used to infer what the printer response would be for a particular gray level that was not actually printed.

If the actual gray level value for a given gray level k in the pixel column j is lighter or darker than the mean value across the entire strip for that given gray level k, then the compensation parameter ΔG needs to be modified. The local slope of the mean tone reproduction curve is used to estimate how much the digital gray level must be changed, i.e., how much $\Delta D_{ijk}$ the value of $\Delta G_{ijk}$ should be modified by, to bring the local gray level k for the $j^{th}$ pixel column closer to the mean gray level for that given gray level k.

Because of measurement noise, there may be errors in estimating the modification to the value of $\Delta G_{ijk}$. Therefore, in various exemplary embodiments, to make the technique less sensitive to measurement noise, the compensation parameter $\Delta G_{ijk}$ is updated by only a fraction f of the full estimated modification $\Delta D_{ijk}$ needed to achieve uniformity across each of the halftone or gray level strips. Specifically, for a next iteration (i+1) of steps S300 S600, the updated compensation parameters $\Delta G_{(i+1)jk}$ are:

$\Delta G_{(i+1)jk} = \Delta G_{ijk} + f^* \Delta D_{ijk}$, where:

$\Delta G_{(i+1)jk}$ is the set of compensation parameters for the $(i+1)^{th}$ iteration of steps S300 S600;

$\Delta G_{ijk}$ is the current set of compensation parameters;

$\Delta D_{ijk}$ is the current difference between the mean gray level value for each gray level or halftone strip k and the actual gray level value for the $j^{th}$ pixel column for the $k^{th}$ gray level or halftone strip; and f is a value between 0.0 and 1.0; i.e., 0.0<f≦1.0.

It should be appreciated that, in various exemplary embodiments, the current difference $\Delta D_{ijk}$ can be used as the metric for determining if there is sufficient uniformity. In these exemplary embodiments, the values for the $\Delta D_{ijk}$ parameters are initially set to ∞, so that two iterations are always required. Then, after the first iteration of step S700, the $\Delta D_{ijk}$ parameters are set to actual values. A uniformity metric is obtained from the profile of the $\Delta D_{ijk}$ parameters. This metric could be as simple as requiring all $\Delta D_{ijk}$ parameters to be less than some threshold. Alternatively, a more complicated function of the profile that takes into account the human visual response system could be used. If, in step S600, the uniformity metric meets the uniformity criterion, sufficient uniformity has been obtained, and operation jumps to step S800.

In step S800, the compensation parameters $\Delta G_{jk}$ are transformed into a table, or are parameterized as a function, so that the compensation values $\Delta G_{jk}$ can be applied in real time when printing grayscale data using the printer. Then, in step S900, operation of the method ends.

It should be appreciated that, in general, f can be less than 1.0. In these situations, a number of iterations may be necessary to obtain sufficiently uniform printed compensation test patterns. In various other exemplary embodiments, f can be set to 1.0. This effectively limits the number of iterations to one, since the full compensation parameter values are applied to the next printed compensation test pattern, which should result in sufficient uniformity. It should further be appreciated that, in various exemplary embodiments, steps S600 and S700 can be omitted. This also effectively sets f to 1.0. In this iteration, after the compensation parameters $\Delta G_{jk}$ are generated in step S200 and steps S300 and S400 are performed once, operation jumps directly from step S500 to step S800. Accordingly, only a single iteration of steps S300-S500 is performed.

Figure 7:
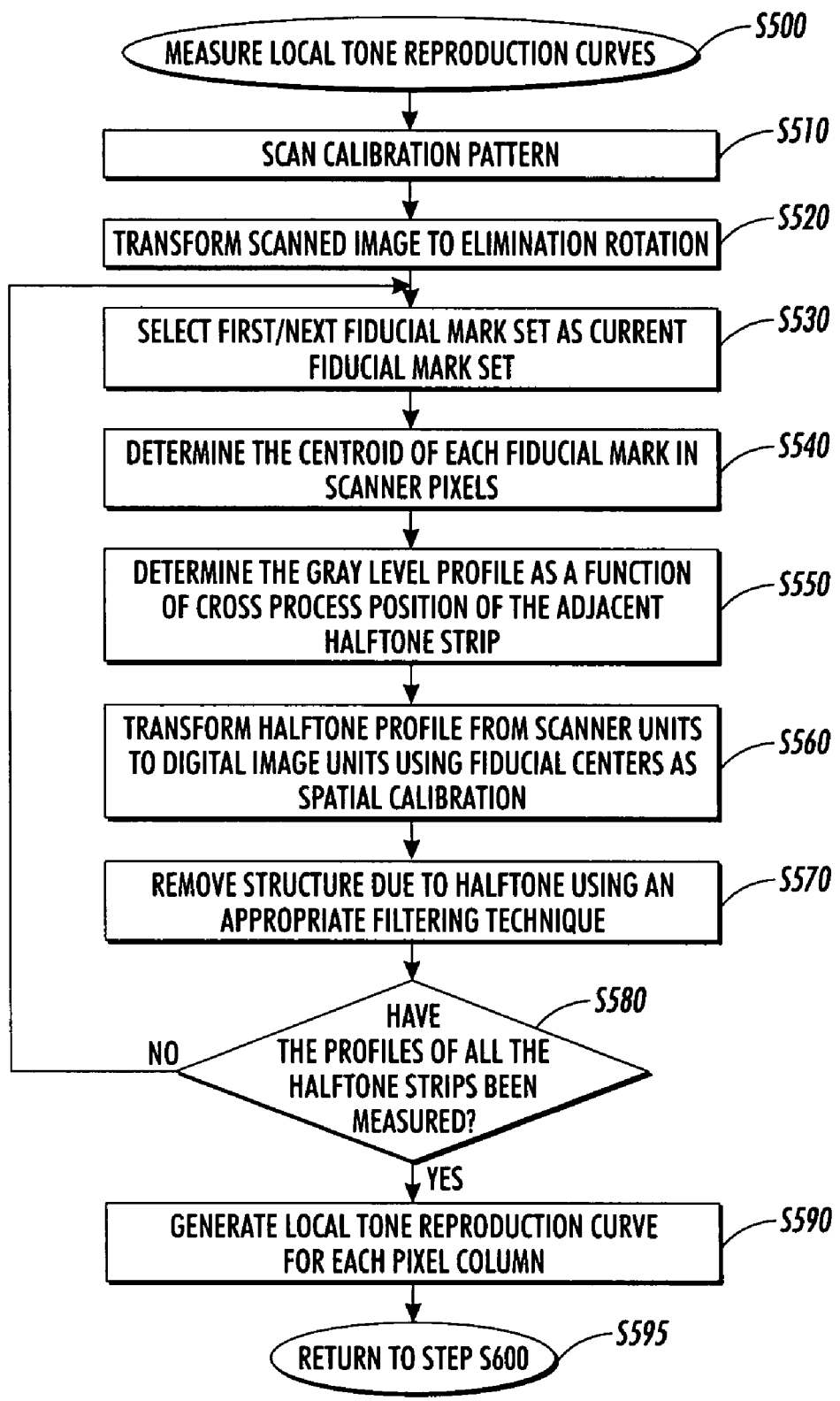
FIG. 7 is a flowchart outlining in greater detail one exemplary embodiment of the method for generating the set of local tone reproduction curves using the test pattern shown in FIG. 5.

FIG. 7 is a flowchart outlining in greater detail one exemplary embodiment of a method for generating a set of local tone reproduction curves according to this disclosure. As shown in FIG. 7, operation of the method begins in step S500, and continues to step S510, where the printed compensation test pattern is scanned. It should be appreciated that the printed compensation test pattern can be scanned internally within the image forming device or can be scanned using a physically separate scanner. Operation then continues to step S520.

It should be appreciated that the captured image obtained by scanning the printed compensation test pattern may not be perfectly oriented to the scanning axes due to rotation of the paper on the scanner platen and/or rotation of the printed image on the paper. Accordingly, in step S520, any rotation of the image relative to the scanning axes is determined using features of the printed compensation test pattern and/or features of the fiducial marks printed elsewhere on the printed compensation test pattern for this purpose. Any rotation of the image is dealt with by appropriate image processing techniques. Alternatively, the image can be processed based on the measured rotation to identify the features within the image. Operation then continues to step S530.

As shown in FIG. 5, the printed compensation test pattern includes some number of sets of fiducial marks and what should be uniform halftone strips. In step S530, the physical position of a first or next row of fiducial marks is selected as a current fiducial row. This can be performed using any of a number of conventional techniques. One particular robust technique is to scan, line by line, through the captured image to identify those scan lines that give a strong signal at the period of the spacing between the fiducials. From the location of the fiducial row, the position of any adjacent halftone strips can also be identified. Alternatively, the positions of the adjacent halftone strips can be identified using the edge location marks. Operation then continues to step S540.

In step S540, the centroid of each fiducial mark in the current row of fiducial marks is determined. In various exemplary embodiments, the centroid is determined by taking a cross-section through the fiducial marks of the current row of fiducial marks, averaging over the length of those fiducial marks. Then, in step S550, a profile of the halftone strip that follows the current row of fiducial marks, i.e., the current halftone strip or gray level strip, as a function of position in scanner pixel units along the cross-process direction is generated. Next, in step S560, the profile of the current halftone strip or gray level strip is transformed from being defined based on the scanner pixel units to being defined based on digital image pixel units. This transform is performed based on the relationship between the measured centroid positions and the digital image centroid position of the fiducial marks of the current row of fiducial marks. Operation then continues to step S570.

In step S570, the high frequency structure in the profile of the current halftone strip, or gray level strip, due to the halftone screen is removed. The halftone frequency structure can be removed using any of a variety of known techniques. One technique is to use distributed aperture filtering. In this technique, over short segments of the image, the change in gray level as a function of pixel at the halftone period is calculated and subtracted from the profile. Next, in step S580, a determination is made whether all of the halftone or gray level strips have been analyzed. If all of the halftone or gray level strips have been analyzed, operation continues to step S590. Otherwise, if not all the halftone or gray level strips have been analyzed, operation returns to step S530.

In step S590, because a set of ($N_p$ by $N_s$) gray levels have been obtained, where $N_p$ is the number of pixel columns in the printed compensation test pattern and $N_s$ is the number of strips in the printed compensation test pattern, these gray level values are ordered by column to obtain a set of $N_p$ local tone reproduction curves, where the local tone reproduction curve has been sampled at $N_s$ points. It should be appreciated that the methods and systems of the 573 patent, or of any other appropriate local tone reproduction curve generating technique, can be used to generate the local tone reproduction curve for each cross-process-direction image-forming device pixel location based on the average gray levels of the halftone strips for cross-process-direction scanner image pixel column and the determined relationship between the cross-process-direction image-forming device pixel locations and the cross-process-direction scanner image pixel columns. Operation then continues to step S595, where operation returns to step S600.

As outlined above with respect to FIG. 5, some pairs of adjacent compensation strips may not have intervening intermediate sets of fiducial marks. Likewise, the first or last sets of fiducial marks may be omitted. In some such exemplary embodiments, one or more sets of fiducial marks may be associated with two or more compensation strips. In such exemplary embodiments, after a first or next set of fiducial marks is selected in step S530, before steps S540-S550 are performed, if the selected set of fiducial marks has two or more compensation strips associated with that selected set of fiducial marks, one of those associated compensation strips is selected as the current compensation strip. Steps S540-S570 are then performed for that current compensation strip. Then, before step S580 is performed, each other compensation strip associated with the selected set of fiducial marks is selected in turn and steps S540-S570 repeated for that compensation strip.

Figure 8:
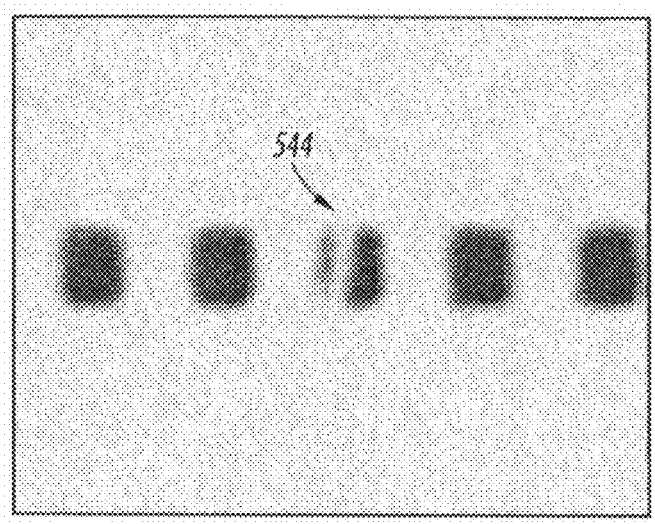
FIG. 8 is a magnified region showing a scratched fiducial.
Figure 9:
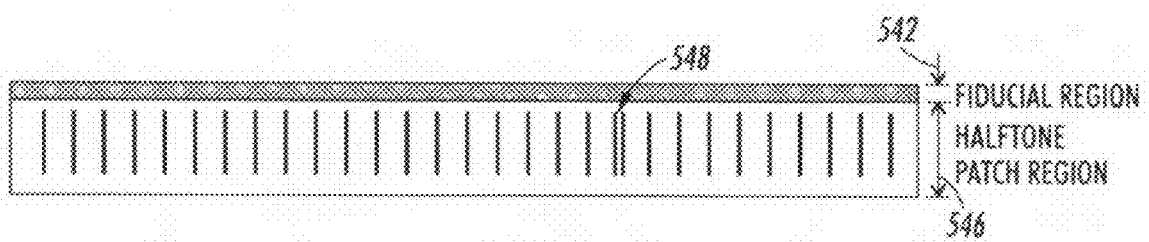
FIG. 9 is a video output of a bit-constrained software model with the actual scratched fiducial of FIG. 8.

As described above, in order to precisely locate the halftone patches and map the TRCs to the appropriate pixels, a fiducial pattern or region 542 with a known periodic frequency is placed above each patch area or region 546 (see FIGS. 8 and 9). Sometimes the fiducial pattern 542 itself may be damaged before it is sensed. The underlying photoreceptor reflectivity may also vary thereby decreasing the contrast of the fiducial and causing an error in mapping the halftone strip. Inaccurate fiducial center or centroid information can result in improper pixel mapping (i.e. from scanned coordinates to digital image coordinates). These imperfections may result in applying an incorrect spatial TRC mapping to the digital input image.

FIG. 8 shows a magnified fiducial region 543 having a scratched fiducial 544. The scratch 544 represents a vertical scratch running through the left-side of an individual fiducial. This type of artifact generates a minimum "doublet" during the fiducial center calculations, thereby causing an incorrect pixel mapping. FIG. 9 shows a "tagged" video output of the bit-constrained software model processed with the actual scratched fiducial depicted in FIG. 8. A center "doublet" 548 is generated due this fiducial artifact, which in this case could potentially result in an incorrect TRC mapping to the pixels contained within the doublet region.

Figure 10:
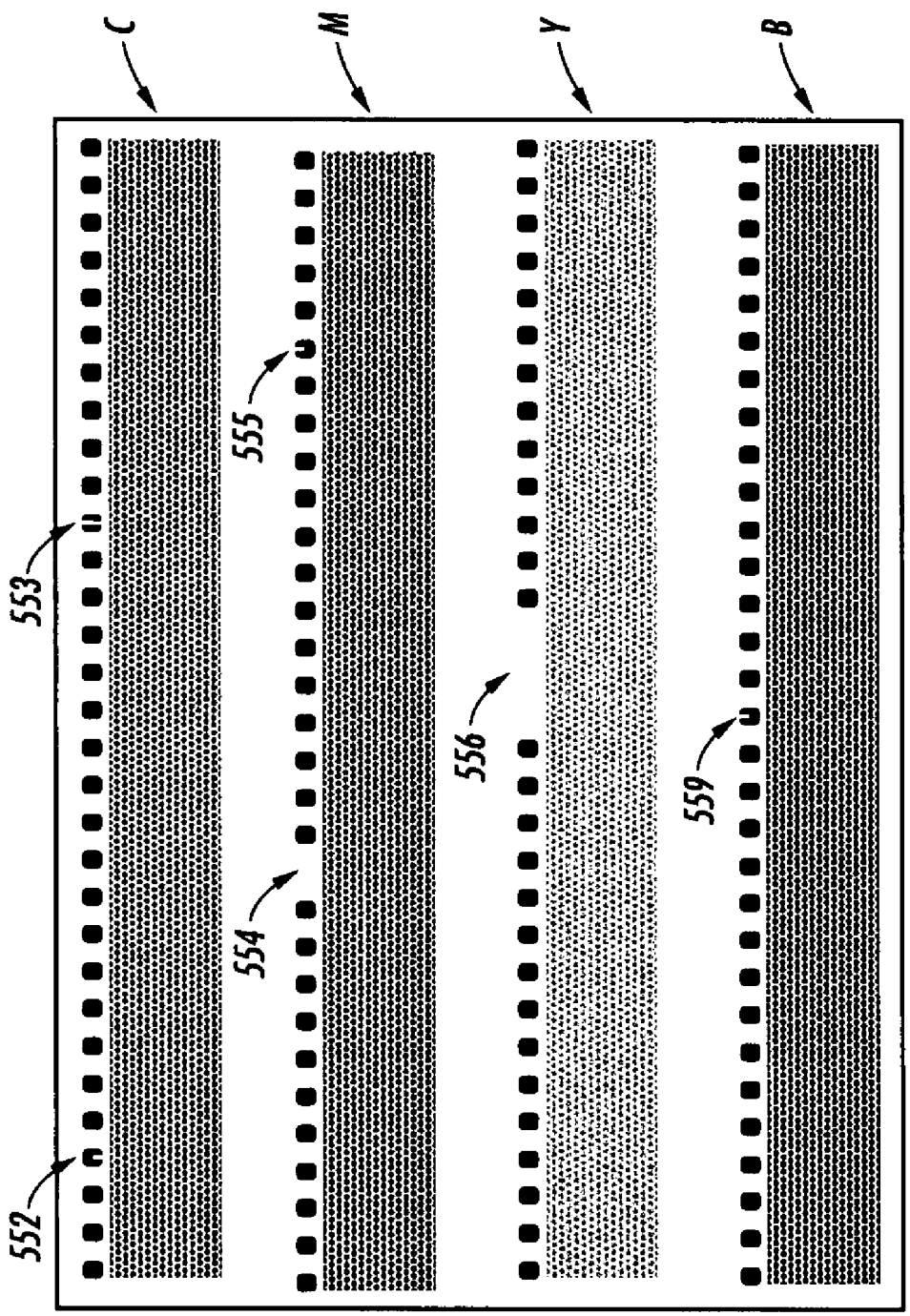
FIG. 10 is an exemplary image having a plurality of various fiducial artifacts which is used as video input and processed via the bit-constrained algorithm.
Figure 11:
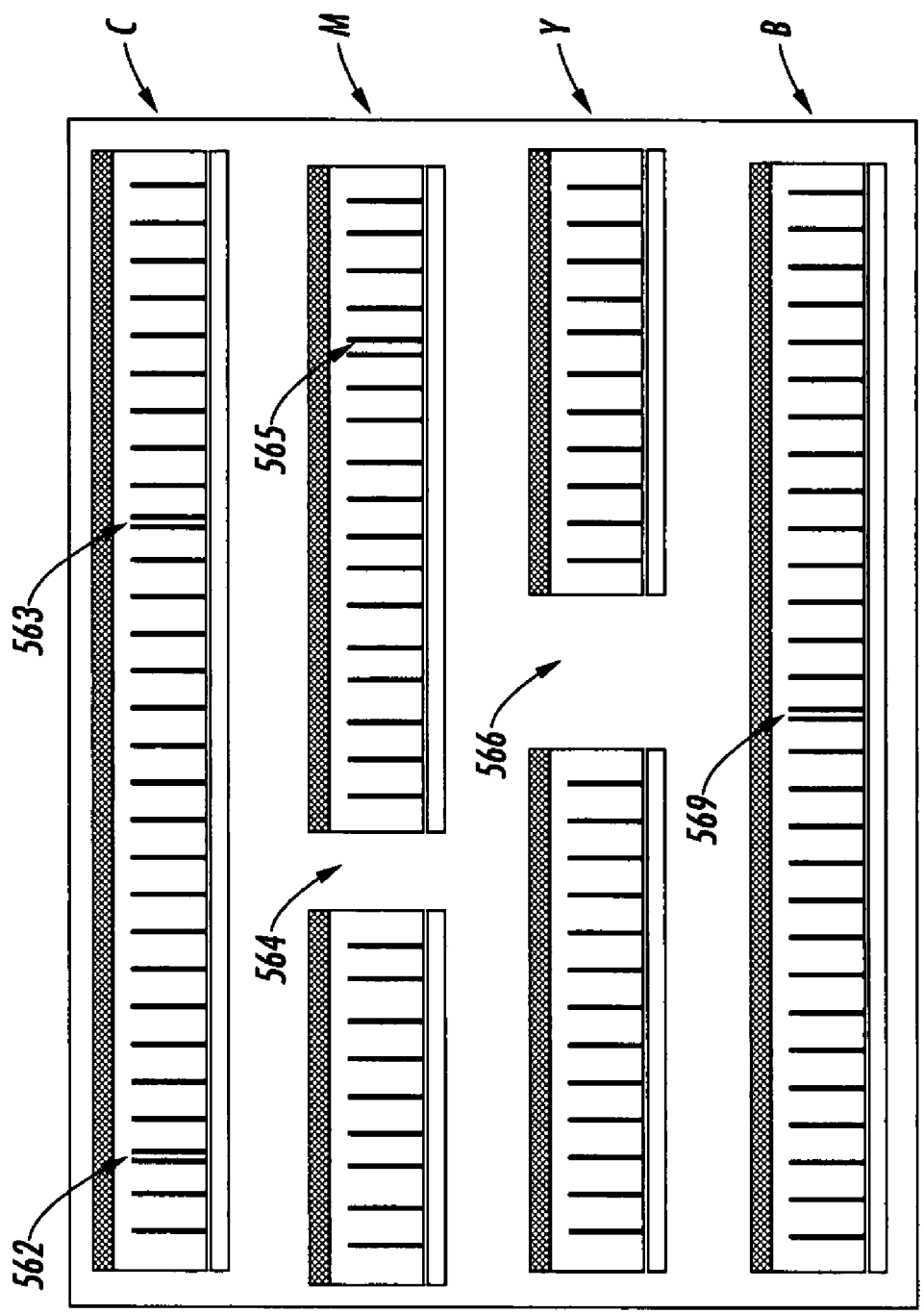
FIG. 11 is a video output of a bit-constrained software model with the actual fiducial artifacts of FIG. 10.

Referring now to FIG. 10, wherein several fiducial artifacts are therein shown, namely, missing and scratched fiducials. Missing fiducials can result where one or more fiducials are degraded such that they are not detected at all by the match/null filters and associated fiducial-center computations. FIG. 10 illustrates several fiducial artifacts, i.e. two scratched fiducials 552, 553 can be seen in the cyan C; one missing fiducial 554 and one scratched fiducial 555 in the magenta M, three missing fiducials 556 in the yellow Y; and one scratched fiducial 559 in the black B. FIG. 11 displays the "tagged" output of the bit-constrained software model using the artifact-laced image of FIG. 10. Entire fiducial and halftone patch regions are missing 564, 566. In addition, there are multiple fiducial-center "doublet" artifacts 562, 563, 565, 569.

Figure 12:
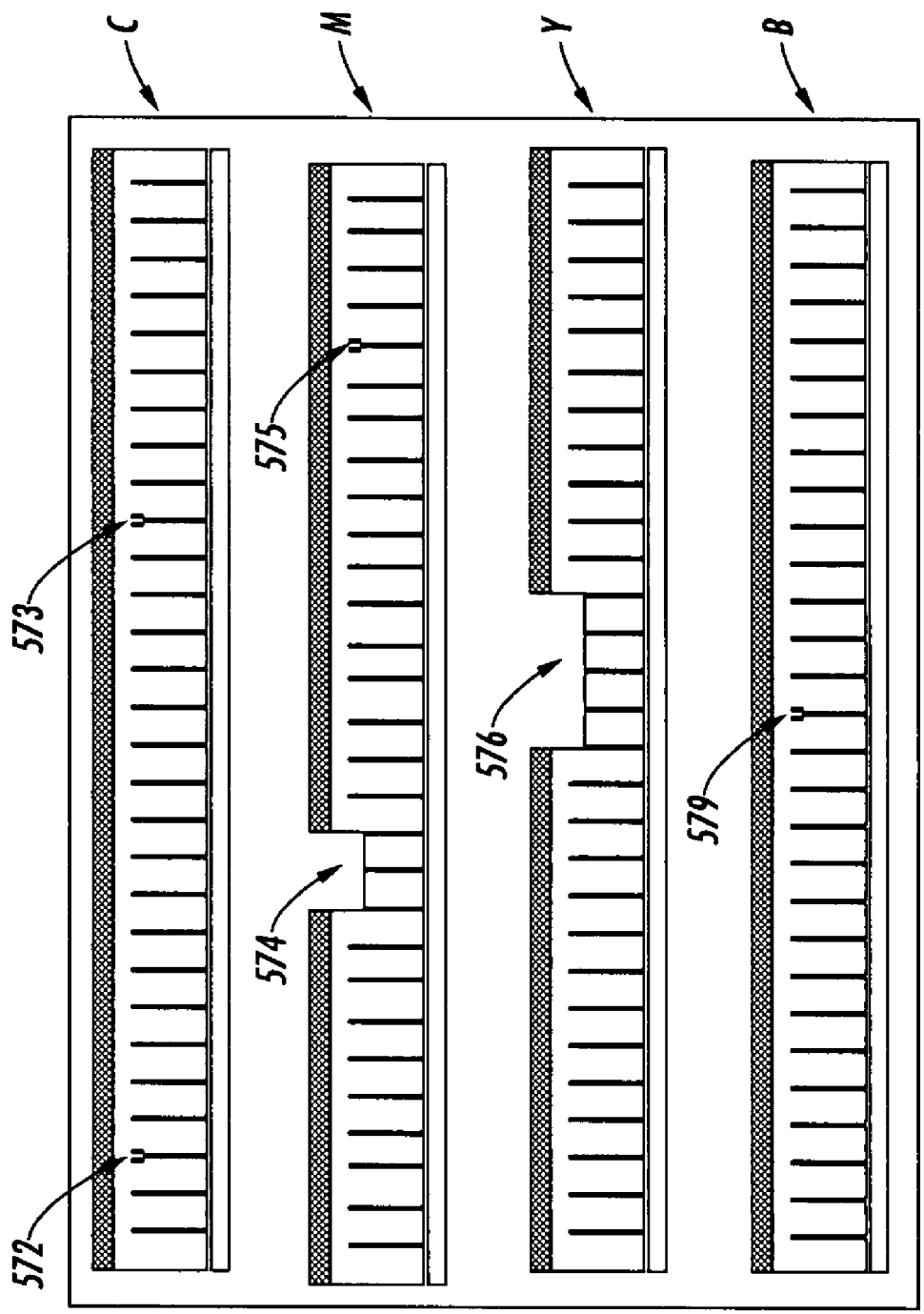
FIG. 12 is a video output of the bit-constrained software model with the actual fiducial artifacts of FIG. 10, after fiducial center compensation.

To be described hereinafter, fiducial center compensation can be applied to detect multiple minimums and/or missing fiducials so that these situations can be dynamically corrected prior to calculating the fiducial centers or centroids. FIG. 12 displays a "tagged" output using the same artifact laced images shown in FIG. 10 after the fiducial center compensation has been processed. In this case, the fiducial center doublets 572, 573, 575, 579 are properly merged while at the same time extra fiducial centers 574, 576 are properly added to the approximate locations of the missing fiducials.

Figure 13:
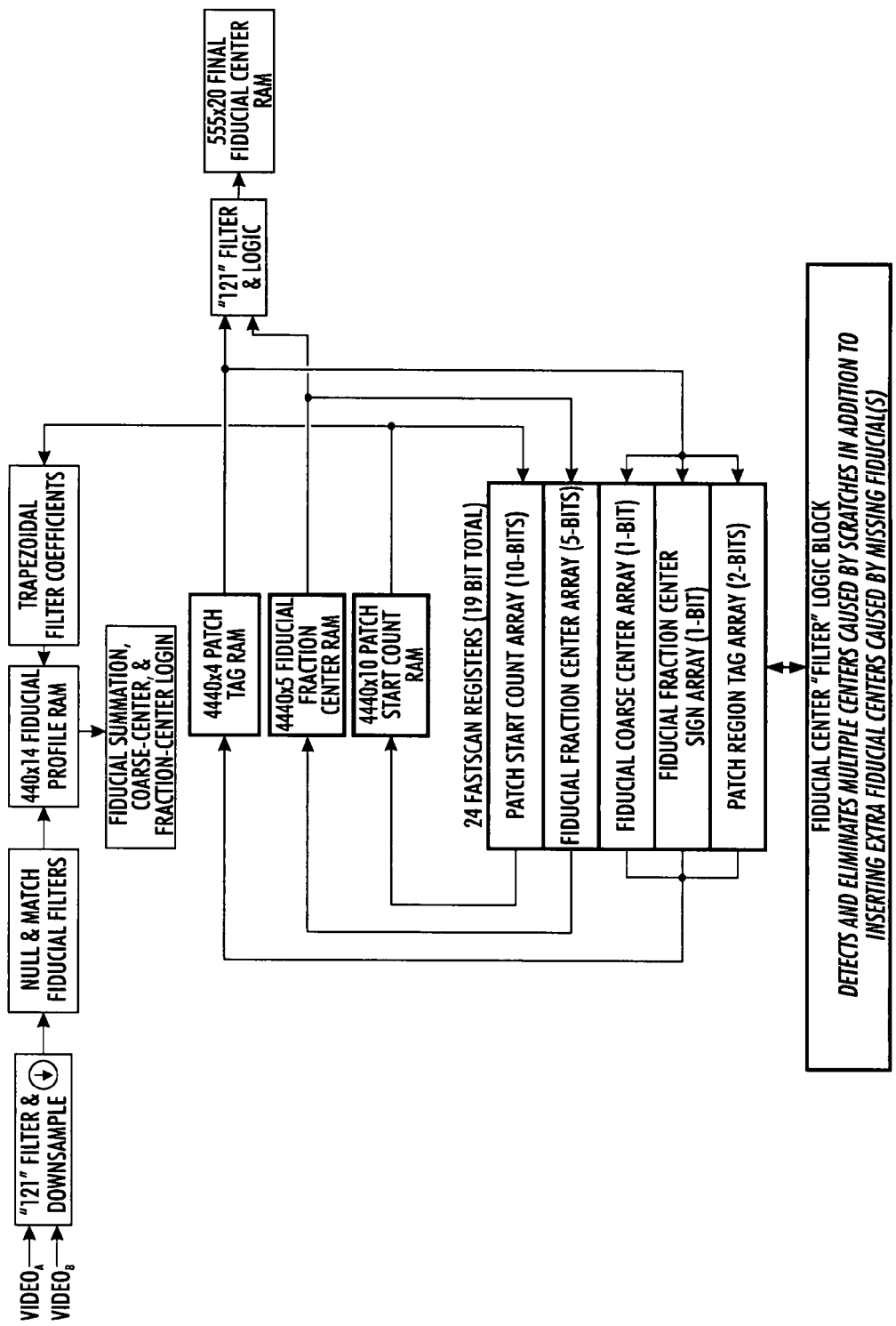
FIG. 13 is a block diagram of the fiducial center detection hardware circuit.

FIG. 13 shows a block diagram of the fiducial center detection hardware circuit for the fiducial center compensation computations. The main hardware mechanism for detecting and compensating for either missing or multiple center fiducials is the use of internal, on chip register arrays. Register arrays allow simultaneous access to each node within a video pipe, thereby allowing multiple comparisons to take place in one clock cycle. In addition, on-chip memories were used to store the previous scanline's attributes. In this case, the patch start-count, fiducial coarse/fractional components, and previous tag information were accessed and sent to the register arrays. The data stored within the register array can be dynamically updated/modified in one clock cycle, thereby allowing fast and efficient changes to the fiducial center information on a pixel-by-pixel basis. The combined circuit acts as a large, integrated shift register, where new data is sent to the beginning of the register array while the oldest data is retrieved and subsequently stored in memory, thereby updating the tag information on every scanline.

Figure 14:
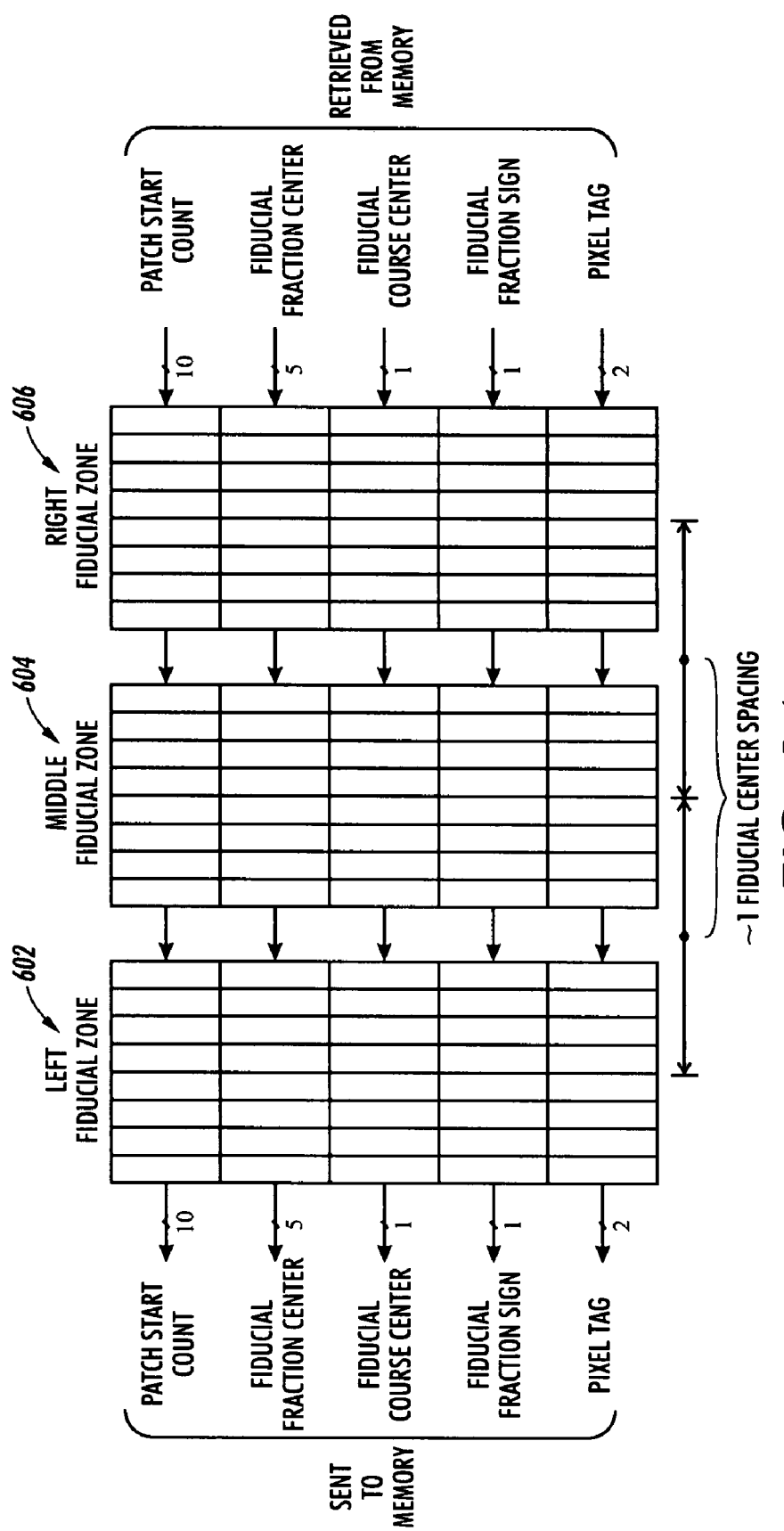
FIG. 14 is an example of a fiducial compensation register array.

FIG. 14 displays a more detailed representation of the fiducial compensation register array. The array is spit into three fiducial "zones"; left 602, middle 604, and right 606, with eight registers per zone. In the one exemplary embodiment, the fiducial regions (on average) are spaced at approximately 16 pixel intervals. However, the image can be first down-sampled by one-half, whereby the center pixels are thus spaced at approximately 8-pixels, or 8-shift-register stages. As the fiducial information flows from (right to left) through each zone, the center of the shift-register stages can be used to determine whether or not the register array includes one or more missing fiducials (i.e. middle fiducial zone 614 shown in FIG. 15) or whether multiple "doublet" centers exist (i.e. middle fiducial zone 624 shown in FIG. 16).

Figure 15:
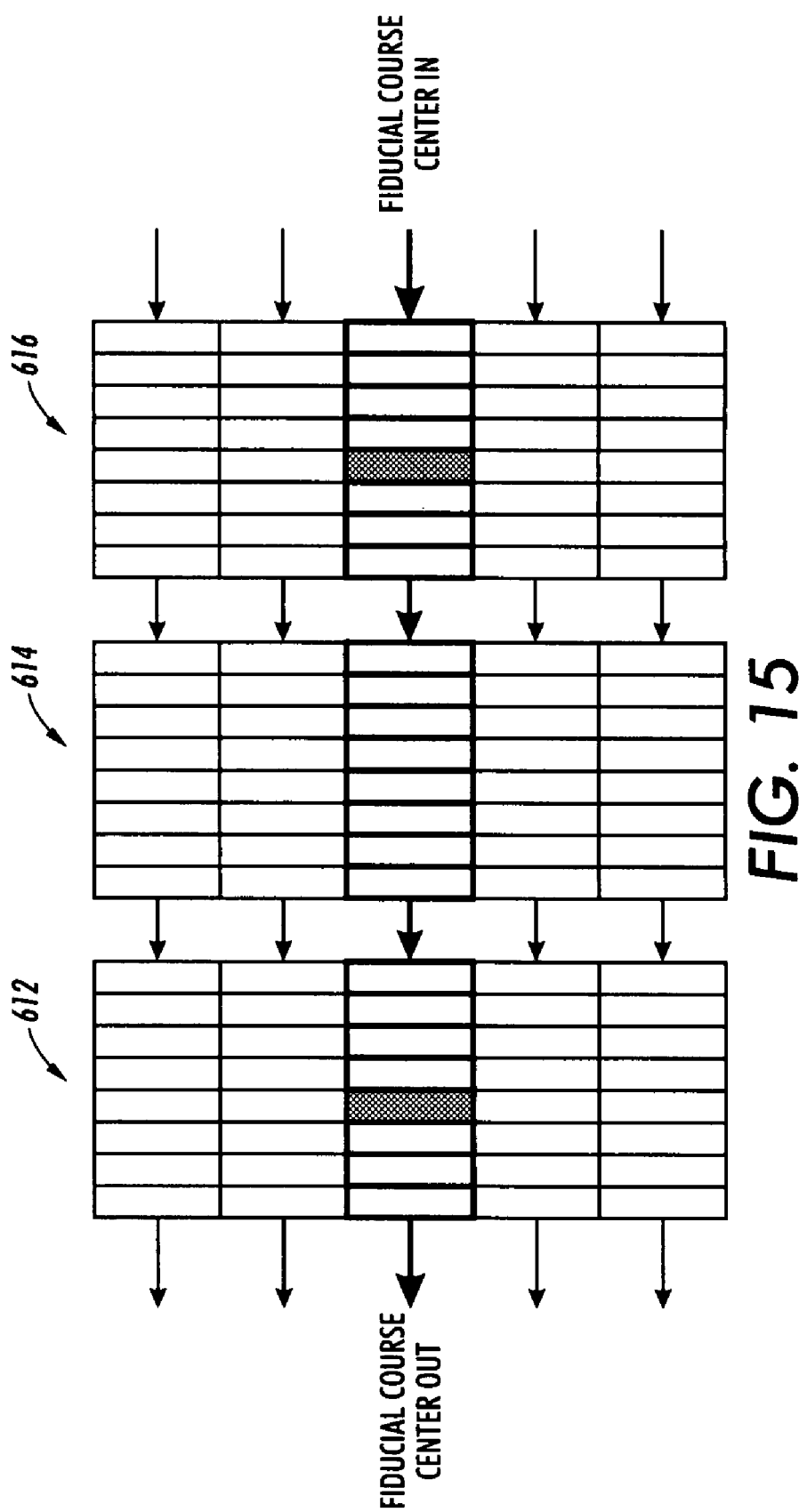
FIG. 15 is an example of a compensation register array having a missing fiducial; and, FIG. 16 is an example of a compensation register array having a doublet fiducial.

As shown in FIG. 15, a missing fiducial exists within the center fiducial zone 614, and therefore, the information contained within this middle-zone 614 can be overwritten with the most precise data available within the left 612 and right 616 fiducial zones. The pixel tag in the middle-zone would more than likely be tagged as "bare-belt", however, this can now be updated and tagged as "halftone". In addition, the actual fiducial coarse and fractional center components can be determined by simply asserting one register within the middle-zone, and using the same fractional component contained within the left-zone. In this example, multiple "missing" fiducials can be detected and a 'pseudo-fiducial' center can be inserted where needed, with the resulting output centers approximately located where the fiducials "should have been".

Figure 16:
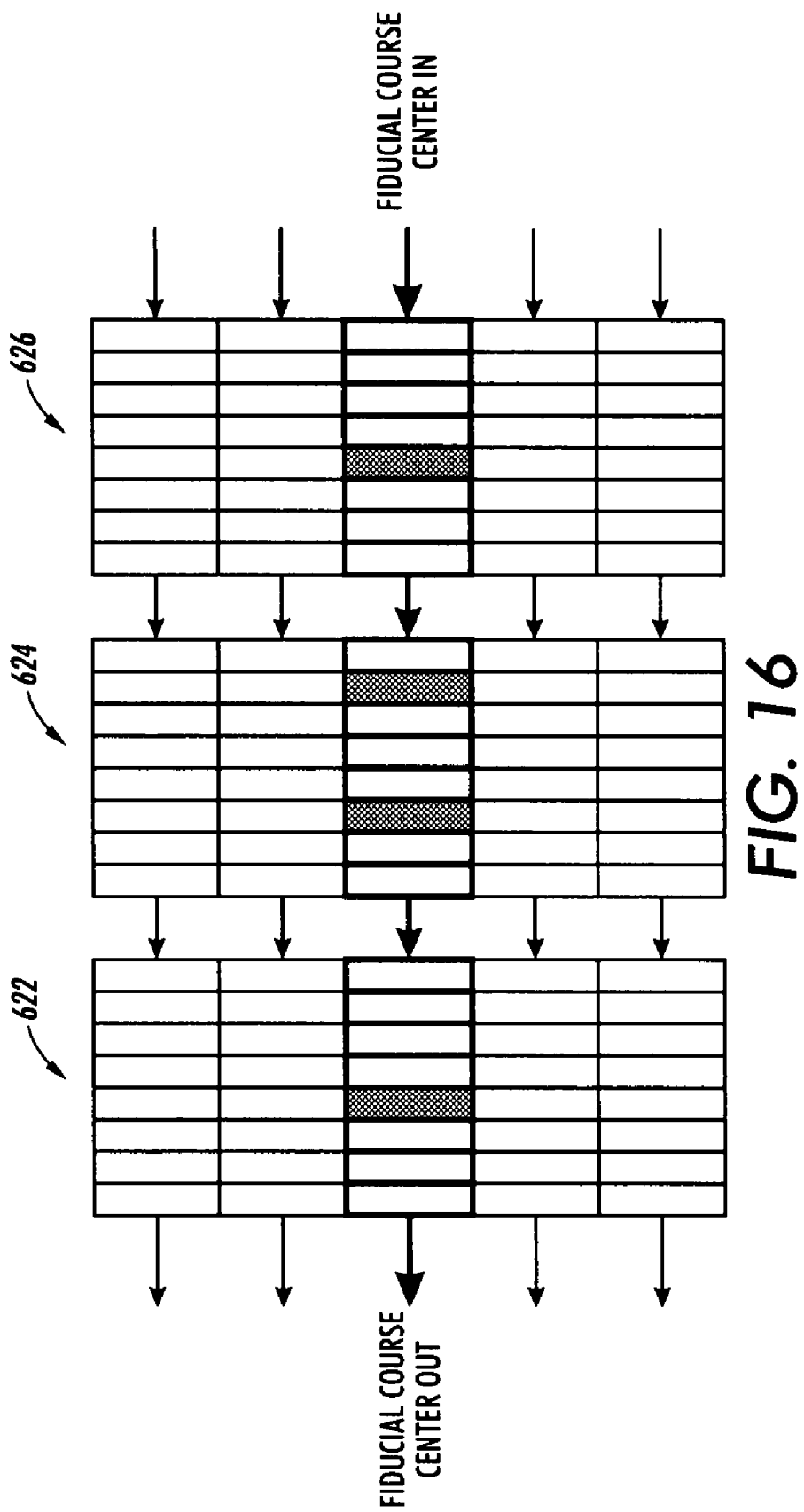

Similarly, as shown in FIG. 16, a doublet fiducial exists within the center fiducial zone 624, therefore, the information contained within this middle-zone 624 can be overwritten with a single "center" (i.e merging the centers of the doublet) based upon the information contained within the left 622 and right 626 fiducial zones.

While this disclosure has been described in conjunction with the exemplary embodiments outlined above, various alternatives, modifications, variations, improvements, and/or substantial equivalents, whether known or that are or may be presently unforeseen, may become apparent to those having at least ordinary skill in the art. Accordingly, the exemplary embodiments of the disclosure, as set forth above, are intended to be illustrative, not limiting. Various changes may be made without departing from the spirit and scope of the disclosure. Therefore, the claims as filed and as they may be amended are intended to embrace all known or later-developed alternatives, modifications, variations, improvements, and/or substantial equivalents.

The invention claimed is:

1. A method for compensating for streak defects in an image formed using an image forming device that forms the image on a receiving material that is translated through the image forming device along a process direction, comprising:

printing a plurality of gray level portions, each gray level portion having a gray level that is different from the other gray level portions and extending along the cross-process-direction, the plurality of gray level portions arranged along the process direction, and spaced from each other along the process direction such that a gap is provided between each pair of adjacent gray level portions;

printing a number of rows of fiducial marks, the rows of fiducial marks distributed among the plurality of gray level portions and comprising at least some of: a first row of fiducial marks located before the plurality of gray level portions along the process direction, a second row of fiducial marks located after the plurality of gray level portions along the process direction, and at least one third row of fiducial marks, each third row of fiducial marks located in a gap between a pair of adjacent gray level portions;

scanning the plurality of gray level portions and number of rows of fiducial marks to generate a set of scanned image data, the scanned image data defining an image value for each of a plurality of scanned image cross-process-direction pixel locations for at least one of the gray level portions and for at least one row of fiducial marks;

determining for each of the fiducial marks in at least one row of fiducial marks associated with the current scanned image cross-process-direction pixel location, a centroid of that fiducial mark;

analyzing the scanned image data for at least one of the at least one row of fiducial marks to determine at least one missing fiducial mark based on a location of at least one fiducial mark of the at least one row of fiducial marks in the scanned image data; and, compensating for at least one missing fiducial mark by overwriting and asserting at least one fiducial having a centroid determinable by the centroids of adjacent fiducials.

2. The method of claim 1, wherein compensating for at least one missing fiducial includes analyzing a fiducial compensation register array, the array having three fiducial zones, a left zone, a middle zone, and a right zone; and, detecting a fiducial in at least one of the fiducial zones and failing to detect a fiducial in at least one of the other fiducial zones.

3. The method of claim 2, wherein analyzing the scanned image data based on the scanned image cross-process-direction pixel location of at least one fiducial mark of the at least one row of fiducial marks to determine at least one actual gray level value for at least one of the plurality of gray level portions for at least one cross-process-direction image-forming device pixel location comprises: selecting one of the scanned image pixel locations as a current scanned image cross-process-direction pixel location; selecting one of the plurality of gray level portions as a current gray level portion; selecting, based on the current gray level portion, at least one of the number of rows of fiducial marks; determining, based on the current scanned image cross-process-direction pixel location, at least one fiducial mark in at least one of the at least one selected row of fiducial marks that is associated with the current scanned image pixel location; determining, for the cross-process-direction image-forming device pixel location associated the selected scanned image pixel location, the actual gray level value for the selected gray level portion of the associated cross-process-direction image-forming device pixel location based on the determined and asserted centroids of the associated fiducial marks.

4. The method of claim 3, wherein analyzing the scanned image data further comprises repeating the gray level selecting, the at least one row of fiducial marks selecting, the at least one mark determining, the centroid determining and the actual gray level determining steps for each of the plurality of gray level portions.

5. The method of claim 3, further comprising: determining, for that fiducial mark, an average gray level value for each scanner pixel location along the cross-process direction associated with that fiducial mark; developing an intensity vs. cross-process position curve; and identifying each side of that fiducial mark along the cross-process direction based on the intensity vs. cross-process position curve and a determined threshold value; wherein determining, for each of the determined fiducial marks that are associated with the current scanned image pixel location, a centroid of that alignment mark comprises: determining a maximum value on the intensity vs. cross-process position curve for that fiducial mark as the centroid of that fiducial mark.

6. The method of claim 5, where determining, for the cross-process-direction image-forming device pixel location associated with the selected scanned image cross-process-direction pixel location, the actual gray level value for the selected gray level portion of the associated cross-process-direction image-forming device pixel location based on the determined and asserted centroids of the first and second associated fiducial marks comprises determining the cross-position process-direction image-forming device pixel location that is associated with the selected scanned image cross-process-direction pixel location based on the locations of the asserted centroid of the at least one asserted fiducial mark.

7. The method of claim 2, wherein generating the compensation parameter for each analyzed cross-process-direction image-forming device pixel location and for each analyzed gray level portion of that analyzed cross-process-direction image-forming device pixel location comprises generating a local tone reproduction curve value for that analyzed gray level value and for that analyzed cross-process-direction image-forming device pixel location that is usable in place of a generalized tone reproduction curve value for the image device, to convert input image data into printable image data such that the actual gray level value that is printed for that cross-process-direction image-forming device pixel location is substantially equivalent to the intended gray level value.

8. The method of claim 7, further comprising generating a local tone reproduction curve that provides a compensation parameter for each possible intended gray level value for that analyzed cross-process-direction image-forming device pixel location.

9. The method of claim 8, wherein generating a local tone reproduction curve comprises determining compensation parameters for each possible intended gray level value based on the determined compensation parameters for the plurality of actual gray level portions.

10. A method for compensating for streak defects in an image formed using an image forming device that forms the image on a receiving material that is translated through the image forming device along a process direction, comprising:
  printing a plurality of gray level portions, each gray level portion having a gray level that is different from the other gray level portions and extending along the cross-process-direction, the plurality of gray level portions arranged along the process direction, and spaced from each other along the process direction such that a gap is provided between each pair of adjacent gray level portions;
  printing a number of rows of fiducial marks, the rows of fiducial marks distributed among the plurality of gray level portions and comprising at least some of: a first row of fiducial marks located before the plurality of gray level portions along the process direction, a second row of fiducial marks located after the plurality of gray level portions along the process direction, and at least one third row of fiducial marks, each third row of fiducial marks located in a gap between a pair of adjacent gray level portions;
  scanning the plurality of gray level portions and number of rows of fiducial marks to generate a set of scanned image data, the scanned image data defining an image value for each of a plurality of scanned image cross-process-direction pixel locations for at least one of the gray level portions and for at least one row of fiducial marks;
  determining for each of the fiducial marks in at least one row of fiducial marks associated with the current scanned image cross-process-direction pixel location, a centroid of that fiducial mark;
  analyzing the scanned image data for at least one of the at least one row of fiducial marks to determine at least one scratched fiducial mark based on a location of at least a pair of fiducial marks of the at least one row of fiducial marks in the scanned image data; and,
  compensating for at least one scratched fiducial mark by overwriting and asserting at least one fiducial having a single centroid determinable by the centroids of adjacent fiducials.

11. The method of claim 10, wherein compensating for at least one scratched fiducial includes analyzing a fiducial compensation register array, the array having three fiducial zones, a left zone, a middle zone, and a right zone; and,
  detecting a fiducial in at least one of the fiducial zones and detecting a pair of fiducial marks in at least one of the other fiducial zones.

12. The method of claim 11, wherein analyzing the scanned image data based on the scanned image cross-process-direction pixel location of at least one fiducial mark of the at least one row of fiducial marks to determine at least one actual gray level value for at least one of the plurality of gray level portions for at least one cross-process-direction image-forming device pixel location comprises: selecting one of the scanned image pixel locations as a current scanned image cross-process-direction pixel location; selecting one of the plurality of gray level portions as a current gray level portion; selecting, based on the current gray level portion, at least one of the number of rows of fiducial marks; determining, based on the current scanned image cross-process-direction pixel location, at least one fiducial mark in at least one of the at least one selected row of fiducial marks that is associated with the current scanned image pixel location; determining, for the cross-process-direction image-forming device pixel location associated the selected scanned image pixel location, the actual gray level value for the selected gray level portion of the associated cross-process-direction image-forming device pixel location based on the determined and asserted centroids of the associated fiducial marks.

13. The method of claim 12, wherein analyzing the scanned image data further comprises repeating the gray level selecting, the at least one row of fiducial marks selecting, the at least one mark determining, the centroid determining and the actual gray level determining steps for each of the plurality of gray level portions.

14. The method of claim 12, further comprising: determining, for that fiducial mark, an average gray level value for each scanner pixel location along the cross-process direction associated with that fiducial mark; developing an intensity vs. cross-process position curve; and identifying each side of that fiducial mark along the cross-process direction based on the intensity vs. cross-process position curve and a determined threshold value; wherein determining, for each of the determined fiducial marks that are associated with the current scanned image pixel location, a centroid of that alignment mark comprises: determining a maximum value on the intensity vs. cross-process position curve for that fiducial mark as the centroid of that fiducial mark.

15. The method of claim 14, where determining, for the cross-process-direction image-forming device pixel location associated with the selected scanned image cross-process-direction pixel location, the actual gray level value for the selected gray level portion of the associated cross-process-direction image-forming device pixel location based on the determined and asserted centroids of the first and second associated fiducial marks comprises determining the cross-position process-direction image-forming device pixel location that is associated with the selected scanned image cross-process-direction pixel location based on the locations of the asserted centroid of the at least one asserted fiducial mark.

16. The method of claim 11, wherein generating the compensation parameter for each analyzed cross-process-direction image-forming device pixel location and for each analyzed gray level portion of that analyzed cross-process-direction image-forming device pixel location comprises generating a local tone reproduction curve value for that analyzed gray level value and for that analyzed cross-process-direction image-forming device pixel location that is usable in place of a generalized tone reproduction curve value for the image device, to convert input image data into printable image data such that the actual gray level value that is printed for that cross-process-direction image-forming device pixel location is substantially equivalent to the intended gray level value.

17. The method of claim 16, further comprising generating a local tone reproduction curve that provides a compensation parameter for each possible intended gray level value for that analyzed cross-process-direction image-forming device pixel location.

18. The method of claim 17, wherein generating a local tone reproduction curve comprises determining compensation parameters for each possible intended gray level value based on the determined compensation parameters for the plurality of actual gray level portions.

19. A printing system for compensating for streak defects in an image formed using an image forming device that forms the image on a receiving material that is translated through the image forming device along a process direction, comprising:
- a print from the system including a plurality of gray level portions, each gray level portion having a gray level that is different from the other gray level portions and extending along the cross-process-direction, the plurality of gray level portions arranged along the process direction, and spaced from each other along the process direction such that a gap is provided between each pair of adjacent gray level portions;
- the print further including a number of rows of fiducial marks, the rows of fiducial marks distributed among the plurality of gray level portions and comprising at least some of: a first row of fiducial marks located before the plurality of gray level portions along the process direction, a second row of fiducial marks located after the plurality of gray level portions along the process direction, and at least one third row of fiducial marks, each third row of fiducial marks located in a gap between a pair of adjacent gray level portions;
- the printing system including a scan of the plurality of gray level portions and number of rows of fiducial marks to generate a set of scanned image data, the scanned image data defining an image value for each of a plurality of scanned image cross-process-direction pixel locations for at least one of the gray level portions and for at least one row of fiducial marks;
- determining for each of the fiducial marks in at least one row of fiducial marks associated with the current scanned image cross-process-direction pixel location, a centroid of that fiducial mark;
- analyzing the scanned image data for at least one of the at least one row of fiducial marks to determine at least one fiducial artifact based on a location of at least one fiducial mark of the at least one row of fiducial marks in the scanned image data; and,
- compensating for the at least one fiducial artifact by overwriting and asserting at least one fiducial having a single centroid determinable by the centroids of adjacent fiducials.

20. The printing system of claim 19, wherein determining compensation parameters for each possible intended gray level value comprises interpolating between the determined compensation parameters for the plurality of actual gray level portions for intended gray level values that lie between the gray level values of adjacent ones of the plurality of actual gray level portions.

21. The printing system of claim 20, wherein analyzing the scanned image data further comprises repeating the gray level selecting, the at least one row of fiducial marks selecting, the at least one mark determining, the centroid determining and the actual gray level determining steps for each of the plurality of gray level portions.

\* \* \* \* \*